United States Patent Office 3,772,273
Patented Nov. 13, 1973

3,772,273
DERIVATIVES OF QUINOXALINE
Everett E. Gilbert, Morristown, N.J., assignor to Allied
Chemical Corporation, New York, N.Y.
No Drawing. Original application Jan. 17, 1969, Ser. No.
792,130, now Patent No. 3,594,418. Divided and this
application Mar. 17, 1971, Ser. No. 125,417
Int. Cl. C07d 51/78, 49/38
U.S. Cl. 260—250 R 3 Claims

ABSTRACT OF THE DISCLOSURE

New (2-hydroxyhexafluoro-2-propyl) benz-substituted benzoheterocyclic nitrogen compounds useful in the preparation of benzoheterocyclic nitrogen compound carboxylic acids and as hypotensive agents, and new (2-hydroxyhexafluoro-2-propyl)-3,4-diaminobenzene precursor for such compounds.

This application is a division of application Ser. No. 792,130, filed Jan. 17, 1969, now U.S. Pat. 3,594,418.

---

This invention relates to new benzoheterocyclic nitrogen compounds having a (2-hydroxyhexafluoro-2-propyl) group on the benzene ring, and to 1-(2-hydroxyhexafluoro-2-propyl)-3,4-diaminobenzene precursor therefor.

Prior to my invention, benzoheterocyclic nitrogen compounds with a (2-hydroxyhexafluoro-2-propyl) group on the benzene ring were unknown, and attempts to prepare them by the direct reaction of a fluoroperhaloacetone with benzoheterocyclic nitrogen compounds resulted in the formation of adducts wherein the fluoroketone became attached to a nitrogen atom.

I have now found that benzoheterocyclic nitrogen compounds having a (2-hydroxyhexafluoro-2-propyl) group on the benzene ring can be prepared by first introducing the (2-hydroxyhexafluoro-2-propyl) group as a substituent on 1,2-diaminobenzene, then condensing the adjacent amino groups into a 5-membered ring by reaction with nitrous acid, a lower alkane carboxylic acid or phosgene, or to a 6-membered ring by reaction with a symmetrical alpha diketone.

The new compounds of my invention include the precursor 1-(2-hydroxyhexafluoro-2-propyl)-3,4-diaminobenzene and two groups of benz-substituted heterocyclic nitrogen compounds. The latter include Group A, in which the nitrogen-containing ring is a five membered ring and Group B in which the nitrogen-containing ring is a six membered ring. The compounds included in my invention are shown in the general formulas set out below.

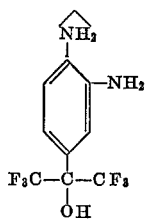

Group A:

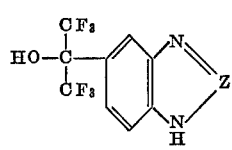

wherein Z represents nitrogen, CH, CCH$_3$ or COH.

Group B:

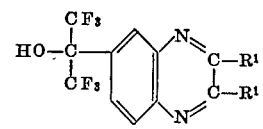

wherein the R$^1$ substituents are the same and each represents H, CH$_3$, phenyl, alpha pyridyl or hydroxyl.

The new precursor compounds of my invention is prepared by reacting hexafluoroacetone with ortho phenylene diamine(1,2-diaminobenzene) according to the Equation I shown below:

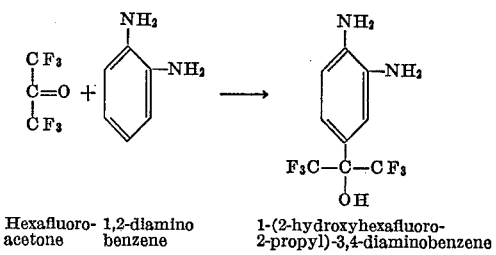

| Hexafluoro- | 1,2-diamino | 1-(2-hydroxyhexafluoro- |
| acetone | benzene | 2-propyl)-3,4-diaminobenzene |

The reaction is carried out by heating the reactants together in the presence or absence of a solvent, precipitating the solid reaction product as by drowning in water, and recovering the precipitate as by filtration.

From the 1-(2-hydroxyhexafluoro-2-propyl)-3,4-diaminobenzene precursor, are prepared all the other compounds of my invention according to the equations set out below.

(II) 6 - (2 - hydroxyhexafluoro-2-propyl)-1,2,3-benzotriazole

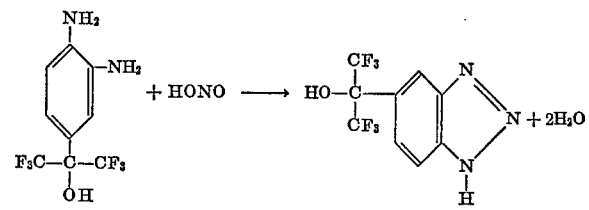

(III) 6 - (2 - hydroxyhexafluoro - 2-propyl)-benzimidazole and 2 - methyl - 6(2-hydroxyhexafluoro-2-propyl)-benzimidazole

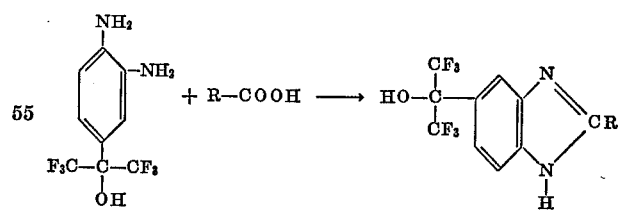

(IV) 2 - hydroxy - 6 - (2-hydroxyhexafluoro-2-propyl)-benzimidazole

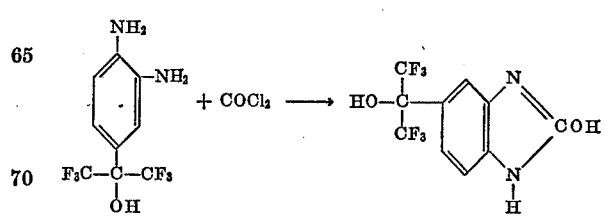

(V) 6 - (2 - hydroxyhexafluoro-2-propyl)-2,3-quinoxalines

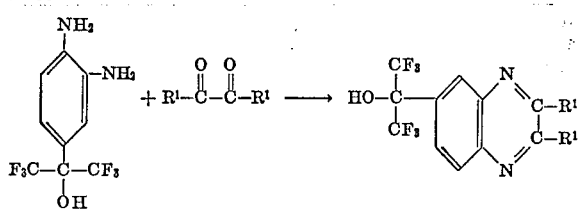

wherein the $R^1$ substituents are the same, and represent H, lower alkyl, phenyl, α-pyridyl and hydroxyl.

Individual compounds coming within the scope of the Group V series of compounds are shown below.

(V(a)) 6 - (2 - hydroxyhexafluoro-2-propyl)-quinoxaline

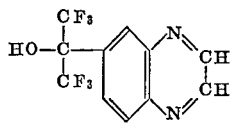

(V(b)) 2,3 - dimethyl - 6 - (2 - hydroxyhexafluoro - 2-propyl)-quinoxaline

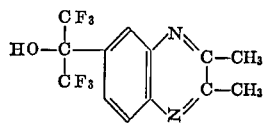

(V(c)) 2,3 - diphenyl - 6 - (2 - hydroxyhexafluoro - 2-propyl)-quinoxaline

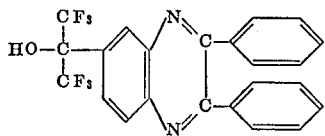

(V(d)) 2,3 - di(2 - pyridyl)-6-(2-hydroxyhexafluoro-2-porpyl)-quinoxaline

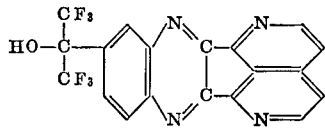

(V(e)) 2,3 - dihydroxy - 6 - (2 - hydroxyhexafluoro-2-propyl)-quinoxaline

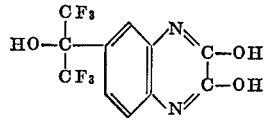

The above reactions are carried out by mixing the reactants together, with a solvent if required, and gently heating for example at 35° to 150° C. for a period of, for example, 1–8 hours, precipitating the solid reaction product as by drowning the reaction mixture in water or a water-polar solvent mixture and recovering the product as by filtration.

The following specific examples further illustrate my invention.

EXAMPLE I 1-(2-hydroxyhexafluoro-2-propyl)-3,4-diaminobenzene

Orthophenylene diamine in the amount of 54 grams (0.5 mole) was mixed with 220 grams (1.0 mole) of hexafluoroacetone trihydrate, and the resulting solution was refluxed at about 105° C. for 24 hours. The mixture was then added to 1 liter of cold (10° C.) water, whereupon a solid product precipitated which was then filtered and air dried. A yield of 127 grams of 1-(2-hydroxyhexafluoro-2-propyl)-3,4-diaminobenzene product was obtained amounting to 93% of theoretical. The product was recrystallized from toluene yielding a purified product having a melting point of about 144° C.

Elemental analysis was performed and showed—Calcd. (percent): C, 39.4; H, 2.9; N, 10.2. Found (percent): C, 39.2; H, 3.0; N, 10.4.

NMR spectrum was taken and confirmed the structure of the compound.

EXAMPLE 2

6-(2-hydroxyhexafluoro-2-propyl)-1,2,3-benzotriazole

Fourteen grams (0.05 mole) of 1-(2-hydroxyhexafluoro-2-propyl)-3,4-diaminobenzene was placed into a mixture of 25 ml. of acetic acid and 60 ml. of water, and was dissolved by warming the mixture to 35° C. Into the mixture was then introduced, all at once, with stirring, 4 grams (0.06 mole) of sodium nitrite ($NaNO_2$) dissolved in 20 ml. of water, thus causing an immediate exothermic reaction generating nitrous acid (HONO) in situ and causing the temperature to rise to 55° C. The 6-(2-hydroxyhexafluoro-2 - propyl)-1,2,3-benzotriazole reaction product separated as a sandy brown precipitate. After stirring for 10 minutes the solid product was filtered and air dried. It amounted to 14 grams equivalent to 98% of theoretical. The crude product had a melting point of 211° C. It was recrystallized from water-isopropanol mixture. The crystallized product had the same melting point of 211° C.

Elemental analysis showed—Calcd. (percent): C, 37.9; H, 1.7; N, 14.8. Found (percent): C, 38.3; H, 1.7; N, 14.9.

EXAMPLE 3

6-(2-hydroxyhexafluoro-2-propyl)benzimidazole 1-(2-hydroxyhexafluoro - 2-propyl) - 3,4-diaminobenzene in the amount of 5.4 grams (0.02 mole) and 10 grams (0.2 mol) of 90% formic acid were refluxed for 8 hours at 100° C. The resulting mixture was diluted with water and neutralized with ammonium hydroxide, whereupon solid 6-(2-hydroxyhexafluoro-2-propyl)-benzimidazole precipitated. The precipitate was then filtered and dried, yielding 5.5 grams of product, equivalent to 98% of theory, having a melting point of 248° C. The product was dissolved in isopropanol, refluxed with decolorizing carbon, then mixed with water, thus precipitating a white solid having the same melting point as given above for the crude product.

Elemental analysis showed—Calcd. (percent): C, 42.3; H, 2.1; N, 9.9. Found (percent): C, 42.0; H, 2.1; N, 10.1.

EXAMPLE 4

2-methyl-1-(2-hydroxyhexafluoro-2-propyl) benzimidazole

Fourteen grams (0.05 mole) of 1-(2-hydroxyhexafluoro-2-propyl)-3,4-diaminobenzene was mixed with 20 grams (0.33 mole) of acetic acid and the mixture refluxed for 10 hours at about 118° C. The resulting solution was poured into water and neutralized with ammonium hydroxide, thus precipitating solid 2-methyl-1-(2-hydroxyhexafluoro-2-propyl)-benzimidazole. The solid product was filtered and dried, yielding 15 grams (100% of theory) of product having a melting point of 297° C. The melting point was unchanged by recrystallization from methanol-water solution.

Elemental analysis showed—Calcd. (percent): C, 44.3; H, 2.7; N, 9.4. Found (percent): C, 44.4; H, 2.8; N, 9.4.

EXAMPLE 5

6-(2-hydroxyhexafluoro-2-propyl)-quinoxaline

Fourteen grams (0.05 mole) of 1-(2-hydroxyhexafluoro-2-propyl)-3,4-diaminobenzene was dissolved in 25 milliliters of isopropanol, and 18 grams of 30% glyoxal (0.1 mole) was added to the solution, producing an immediate exothermic reaction. The resulting mixture was heated for 2 hours at 100° C. with stirring and then drowned in about 5 volumes of water, whereupon solid 6-(2-hydroxyhexafluoro - 2-propyl)-quinoxaline precipitated. The resulting precipitate was filtered and air dried yielding 14.3 grams of product equivalent to 100% of theoretical yield. The precipitate melted at 200° C. Recrystallization from water-isopropanol produced a product having a melting point of 202° C.

Elemental analysis showed—Calcd. (percent): C, 44.6; H, 2.0; N, 9.4. Found (percent): C, 44.9; H, 2.0; N. 9.1.

EXAMPLE 6

2,3-dimethyl-6-(2-hydroxyhexafluoro-2-propyl)-quinoxaline

In the same manner as described in Example 5 above, 14 grams (0.05 mole) of 1-(2-hydroxyhexafluoro-2-proply)-3,4-diaminobenzene and 5 grams of diacetyl were dissolved in 50 milliliters of isopropanol and the mixture was heated for 4 hours at about 80° C. The resulting mixture was drowned in water and the resulting precipitate of 2,3-dimethyl-6-(2-hydroxyhexafluoro-2-propyl)-quinoxaline was filtered and air dried. The dried precipitate amounted to 17 grams equivalent to 100% yield. It had a melting point of 206° C.

Elemental analysis showed—Calcd. (percent): C, 48.1; H, 3.1; N, 8.6. Found (percent): C, 48.4; H, 3.3; N. 8.7.

EXAMPLE 7

2,3-diphenyl-6-(2-hydroxyhexafluoro-2-propyl)-quinoxaline

Fourteen grams (0.05 mole) of 2-(2-hydroxyhexafluoro-2-propyl)-3,4-diaminobenzene was mixed with 11 grams (0.05 mole) of benzil

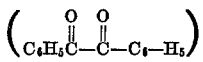

and the mixture was heated for 3 hours at about 100° C. The resulting clear solution was drowned in water, producing an oily layer which hardened into a solid, insoluble in $H_2O$ or hexane, but very soluble in ethyl alcohol, n-butanol, dioxane and isopropanol. The solid 2,3-diphenyl-6 - (2-hydroxyhexafluoro-2-propyl)-quinoxaline product weighed 22.4 grams equivalent to a 100% yield. After recrystallization from isopropanol-water mixture, it had a melting point of 200° C.

Elemental analysis showed—Calcd. (percent): C, 61.5; H, 3.1; N, 6.3. Found (percent): C, 61.5; H, 3.1; N, 6.5.

EXAMPLE 8

2,3-di(2-pyridyl)-6-(2-hydroxyhexafluoro-2-propyl)-quinoxaline

Fourteen grams (0.05 mole) of 1-(2-hydroxyhexafluoro-2-propyl)-3,4-diaminobenzene was mixed with 11 grams (0.05 mole) of alpha pyridil (di-alpha pyridyl glyoxal)

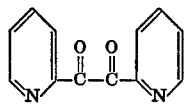

and 50 ml. of isopropanol. The resulting solution was refluxed at about 83° C. for 5 hours. The reaction mixture was then drowned in water whereupon solid 2,3-di-(2-pyridyl)-6-(2-hydroxyhexafluoro-2-propyl) - quinoxaline precipitated. The solid was filtered and dried yielding 26.5 grams (95% of theoretical) of crude product which had a melting point of 242° C. Recrystallization from xylene yielded a purified product having a melting point of 245° C.

Elemental analysis showed—Calcd. (percent): C, 56.0; H, 2.7; N, 12.5. Found (percent): C, 56.2; H, 2.7; N, 12.5.

EXAMPLE 9

2,3-dihydroxy-6-(2-hydroxyhexafluoro-2-propyl)-quinoxaline

Fourteen grams (0.05 mole) of 1-(2-hydroxyhexafluoro-2-propyl)-3,4-diaminobenzene and 13 grams (0.10 mole) of oxalic acid dihydrate $(COOH)_2 \cdot 2H_2O$, were refluxed for 8 hours in a mixture of 50 ml. of water and 50 ml. of concentrated HCl at 100° C., whereupon solid 2,3-dihydroxy-6-(2-hydroxyhexafluoro-2-propyl)-quinoxaline precipitated. The reaction mixture was drowned in water and the solid product filtered and dried, yielding 15.5 grams of product equivalent to a yield of 95% of theory. The product, recrystallized from a mixture of isopropanol-water, had a melting point of 338° C.

Elemental analysis showed—Calcd.: 8.5%. Found: 8.8%.

EXAMPLE 10

2-hydroxy-6-(2-hydroxyhexafluoro-2-propyl)-benzimidazole

Eight grams (0.03 mole) of 1-(2-hydroxyhexafluoro-2-propyl)-3,4-diaminobenzene was dissolved in 50 ml. acetic acid. Then with stirring, a benzene solution of phosgene containing 4.2 grams (0.04 mole) of phosgene, was added all at once, whereupon a solid precipitate formed. The resulting mixture was heated for 2 hours at 100° C., then drowned in water and filtered. The resulting solid 2-hydroxy-6-(2-hydroxyhexafluoro-2-propyl) - benzimidazole product was air dried and yielded 5.3 grams of product equivalent to a yield of 91% of theory. The crude product had a melting point of 270° C., which, after recrystallization from a water-methanol solution, was 271° C.

Elemental analysis showed—Calcd. (percent): C, 40.0; H, 2.0; N, 9.3. Found (percent): C, 39.8; H, 2.1; N, 9.5.

The new benz-substituted benzoheterocyclic nitrogen compounds of my invention can be cleaved with potassium hydroxide, to remove the (2-hydroxyhexafluoro-2-propyl) group, followed by acidification to replace it with a COOH group. Examples 11–14, which follow, illustrate this reaction.

EXAMPLE 11

Benzotriazole-6-carboxylic acid

Five grams (0.018 mole) of the 6-(2-hydroxyhexafluoro-2-propyl)-1,2,3-benzotriazole prepared as described in Example 2 above, and KOH (11 gms., 0.2 mole) were heated with stirring in 20 ml. of diethylene glycol. When the temperature reached about 150° C., gas evolution was noted which continued about 5 minutes. Heating was contained for another 15 minutes up to 175° C. The reaction was cooled, diluted with water, and acidified with 13 ml. concentrated HCl. The desired product separated as a precipitate, which was filtered and air dried. The yield was 95% of the theoretical. After recrystallization from dimethylformamide-water, it decomposed at 310° C. The infrared spectrum showed the disappearance of the $CF_3$ groups.

The acid was alternatively prepared by a known method as follows:

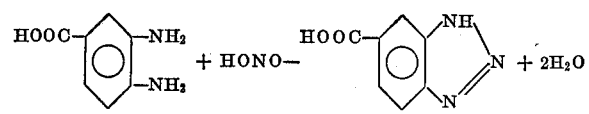

After recrystallization from dimethylformamide-water, it decomposed at 313° C., and gave an infrared spectrum identical with that of the acid prepared from the compound of Example 2.

EXAMPLE 12

Benzimidazole-6-carboxylic acid

Five and six-tenths grams (0.02 mole) of 1-(2-hydroxyhexafluoro-2-propyl)-benzimidazole prepared as described in Example 3 above, and KOH (11.2 gms., 0.2 mole) were reacted in diethylene glycol (20 ml.) as in Example 11. A quantitative yield of solid product was obtained. The acid was dissolved in warm 90% formic acid and the solution evaporated to dryness to give the formic acid salt. It decomposed at 333° C. The melting point was unchanged by recrystallization from 90% formic acid.

The formic acid salt of this acid was alternatively prepared from 3,4-diaminobenzoic acid and excess formic acid by refluxing for 8 hrs., drowning in water, filtering and drying. A quantitative yield was obtained. It decomposed at 345° C., and gave an infrared spectrum identical with that of the acid made from the compound of Example 3.

EXAMPLE 13

2-hydroxybenzimidazole-6-carboxylic acid 2-hydroxy-6-(2-hydroxyhexafluoro-2-propyl)-benzimidazole prepared as described in Example 10, was converted to the corresponding acid by the procedure cited in Example 11. A crude yield of 84% was obtained. After recrystallization from dimethylformamide-water, it decomposed at 296° C.

The same acid was prepared alternatively by reacting 3,4-diaminobenzoic acid with phosgene, as described in the literature. After recrystallization, it decomposed at 403° C. The infrared spectrum was identical with the sample prepared from the compound of Example 10.

EXAMPLE 14

2,3-dihydroxyquinoxaline-6-carboxylic acid 2,3-dihydroxy-6-(2 - hydroxyhexafluoro - 2 - propyl)-quinoxaline prepared as described in Example 9 above (6.0 gms., 0.02 mole) was converted to the acid by the procedure of Example 11. The yield of acid was 66% of theory. It was purified by recrystallization from dimethylformamide-water. It melted above 400° C.; the literature (CA 62, 11833 (1965)) does not give a melting point.

The acid was prepared alternatively by refluxing 3,4-diaminobenzoic acid with oxalic acid in aqueous hydrochloric acid. The yield was quantitative; it melted above 400° C., and gave an infrared spectrum identical with the sample prepared from compound of Example 9. This preparative procedure was that employed in the literature (loc. cit.), except that the reaction was conducted in hot orthodichlorobenzene.

The compounds of my invention have wide utility. Thus, the novel precursor compound of reaction I, namely, 1-(2-hydroxyhexafluoro - 2 - propyl)-3,4-diaminobenzene is useful as one of the starting reactants in the preparation of all the remaining compounds described herein. The resulting (2 - hydroxyhexafluoro-2-propyl)-benz-substituted benzoheterocyclic compounds have a common utility as starting materials for preparing the corresponding carboxylic acids by cleavage of the (2-hydroxyhexafluoro-2-propyl) group with caustic alkali such as NaOH or KOH, followed by acidification as with HCl. These acids have various known uses. Thus, the known acid benzotriazole-6-carboxylic acid which can be prepared by cleavage of my new compound 6-(2-hydroxyhexafluoro-2-propyl)-1,2,3-benzotriazole as described in Example 11 herein, is known to be useful in the stabilization of photographic emulsions (Chem. Abstracts 48, 12593 (1954).) The known acid 2,3 - dihydroxyquinoxaline-6-carboxylic acid, prepared from my novel compound 2,3-dehydroxy-6-(2-hydroxyhexafluoro - 2 - propyl)-quinoxaline, as described in Example 14, as known to be useful in preparing fibre-reactive dyes. (See Angewandte Chemie, Int. Ed. 3(6), 413 (1964) and Chem. Abstracts 62, 11833 (1965). The preparative process for preparing these acids by cleavage of my new compounds is comparatively much simpler and more advantageous than the known process for preparing the acids, which involves use of 3,4-diaminobenzoic acid, available only by a costly, multistep synthesis.

In addition to their general utility for conversion into the corresponding carboxylic acids, a number of compounds of my invention have specific selective hypotensive properties thus rendering them useful in reducing the blood pressure of warm-blooded animals. New compounds described herein having hypotensive properties include 6-(2-hydroxyhexafluoro - 2 - propyl)-1,2,3-benzotriazole (Example 2), 6-(2-hydroxyhexafluoro-2-propyl)-benzimidazole (Example 3), 2,3-dimethyl-6-(2-hydroxyhexafluoro-2-propyl)quinoxaline (Example 6), and 2,3-dihydroxy - 6 - (2-hydroxyhexafluoro-2-propyl)quinoxaline (Example 9).

The fact that some, but not all, of my new compounds have hypotensive activity is surprising in view of the close structural similarity of compounds which do and do not show this property.

EXAMPLE 15

Hypotensive tests

The compounds of Examples 1–6 and 8–10 were tested for hypotensive properties by a standard test procedure which notes the effects on cardiovascular parameters in anesthetized normotensive dogs. Thus, in carrying out the tests, the several above compounds were administered to anesthetized, normotensive dogs. The femoral blood pressure, pressor responses following bilateral carotid artery occlusion, and heart rate are monitored at 20 minute intervals following treatment for at least one hour, and longer if activity is observed. Hypotension (HYPO) is considered to be present if a sustained 20% lowering of blood pressure occurs, and sympathetic reactivity inhibition (SYMP) is considered to be present if the carotid occlusion reflex is decreased 25% or more of control levels. Results of the above test on compounds of the indicated examples are shown in the following table.

HYPOTENSIVE TEST RESULTS

| Compound of Example No. | Hypotensive activity [1] | |
|---|---|---|
| | Min. HYPO | Min. SYMP |
| 1 | I | I |
| 2 | MA | MA |
| 3 | A | A |
| 4 | I | I |
| 5 | I | I |
| 6 | I | WA |
| 8 | I | I |
| 9 | A | A |
| 10 | I | I |

[1] A=Active; MA=Moderately active; WA=Weakly active; I=Inactive.

It is apparent from the above table that the compounds of Examples 3 and 9, namely 6-(2-hydroxyhexafluoro-2-propyl)-benzimidazole and 2,3 - hydroxy-6-(2-hydroxyhexafluoro-2-propyl)quinoxaline, have excellent hypotensive properties (rated A); the compound of Example 2, namely 6-(2-hydroxyhexafluoro-2-propyl-1,2,3-benzimidazole, is moderately active (rated MA); the compound of Example 6, namely 2,3-dimethyl-6-(2-hydroxyhexafluoro-2-propyl)-quinoxaline, is weakly active (WA), while all the other compounds tested had no measurable hypotensive properties and were rated inactive (I).

While the foregoing described the preferred embodiments of my invention, it will be understood that departures can be made therefrom within the scope of the specification and claims.

I claim:

1. (Hydroxyhexafluoro - 2 - propyl)-substituted benzoheterocyclic nitrogen compounds of the formula

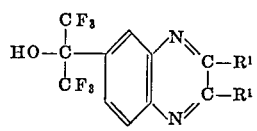

wherein the $R^1$ substituents are the same, and each represents H, $CH_3$, phenyl, α-pyridyl or hydroxyl.

2. 2,3-dimethyl-6-(2-hydroxyhexafluoro-2-propyl)-quinoxaline of the formula
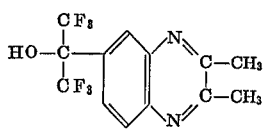
3. 2,3-dihydroxy-6-(2-hydrohexafluoro-2-propyl)-quinoxaline of the formula
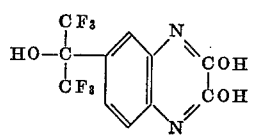
References Cited
UNITED STATES PATENTS
| | | | |
|---|---|---|---|
| 3,086,019 | 4/1963 | Moore et al. | 260—250 R |
| 3,232,946 | 2/1966 | Haszeldine et al. | 260—250 R |
| 3,594,418 | 7/1971 | Gilbert | 260—250 R |
NICHOLAS S. RIZZO, Primary Examiner
U.S. Cl. X.R.
424—250, 269